United States Patent [19]

Hesse et al.

[11] Patent Number: 4,511,292
[45] Date of Patent: Apr. 16, 1985

[54] PNEUMATIC SUCTION DEVICES FOR DISCHARGING GRANULATES

[75] Inventors: Theodor Hesse; Hans Barkmeyer, both of Melle, Fed. Rep. of Germany

[73] Assignee: Engelbrecht & Lemmerbrock GmbH & Co., Melle, Fed. Rep. of Germany

[21] Appl. No.: 451,233

[22] Filed: Dec. 20, 1982

[30] Foreign Application Priority Data

Dec. 28, 1981 [DE] Fed. Rep. of Germany ....... 3151638

[51] Int. Cl.³ .............................................. B65G 53/42
[52] U.S. Cl. .................................... 406/152; 406/113; 406/134
[58] Field of Search ...................... 406/52, 73, 75, 152, 406/113–115, 151, 153, 116, 134, 135, 141, 194

[56] References Cited

U.S. PATENT DOCUMENTS 2,791,470 5/1957 Jolley .................................. 406/152
4,019,641 4/1977 Merz ................................ 406/151 X
4,203,688 5/1980 Shapunov et al. .............. 406/152 X

FOREIGN PATENT DOCUMENTS 2741801 3/1979 Fed. Rep. of Germany ...... 406/152
867807 10/1981 U.S.S.R. ............................... 406/152

*Primary Examiner*—Jeffrey V. Nase
*Assistant Examiner*—Daniel R. Edelbrock
*Attorney, Agent, or Firm*—Balogh, Osann, Kramer, Dvorak, Genova & Traub

[57] ABSTRACT

During pneumatic discharging of granulates or other not readily flowable bulk goods from ships by means of a suction nozzle and a suction pipe connected thereto, it is necessary to loosen the material within range of the suction nozzle and to cause walls of material left standing to collapse. To this end, the suction nozzle is provided with a frame or tube surrounding and spaced from it and suspended and supported on it in an elastic manner, the frame having tools on the outer side for intervention in the materials to be extracted by suction, and being capable of being placed in horizontal pivotal oscillation.

5 Claims, 5 Drawing Figures

PNEUMATIC SUCTION DEVICES FOR DISCHARGING GRANULATES

BACKGROUND OF THE INVENTION

The invention relates to a pneumatic suction device for discharging granulates (different kinds of bruised grain) or other not readily flowable bulk goods from ships by means of a suction pipe having a suction nozzle and suspended from a steerable jib.

It is known that materials are partially caked together very solidly in ships, so that insufficient material is then extracted by means of the suction nozzle of the suction device. This applies in particular if walls of material are left standing in the ship's holds. For this reason, mechanically driven rotating loosening mechanisms have been connected to the suction nozzle, which penetrate into the material or the walls of material left standing, and guide the material to the suction nozzle. It has been observed in practice that the risk of an accident to the personnel prevails under application of such devices drawing the material into the suction nozzle, said personnel being obliged to deal with incidents in the ship's hold, if trouble arises. Furthermore, the existing drawing-in devices are comparatively heavy and result in additionally stressing the jib carrying the same.

It is an object of the invention to secure a loosening action on the goods and a collapse of walls of material in the case of granulates or bruised grain which are not too solidly clumped together in ships, or of other materials which tend to form steep walls which are left standing, without any risks being incurred by the personnel.

SUMMARY OF THE INVENTION

To achieve this and other objects, the invention consists of a pneumatic suction device of discharging granulates or bruised grain or other not readily flowable materials from ships by means of a suction pipe having a suction nozzle suspended from a steerable jib and a frame surrounding the suction nozzle and in a spaced relationship therewith. The frame is formed of a plurality of flat bars arranged in a spaced relationship and being substantially parallel to the longitudinal axis of the suction nozzle and in a plane extending radially with respect to the longitudinal axis of the suction nozzle, and horizontally disposed inner rings which are supported on the suction nozzle in an articulated manner, and join together the plurality of flat bars to form the frame.

In addition, a crank motor is mounted on the suction nozzle to drive and/or place the frame (rings thereof) in horizontal oscillating motion so that the granulates (or bruised grain) and like materials can be loosened for intake by suction by the suction nozzle.

Due to this construction, it becomes possible to form the frame or the like with the external loosening tools with a comparatively low weight, to place or force the same in horizontal oscillation and to offer up the frame and suction nozzle thereupon to the walls of material left erect within the ship's hold, so that these walls are caused to collapse by the oscillating frame without this oscillating frame implying such risks to the personnel required in the ship's hold as could be caused until now by rotating loosening tools. The oscillatory stroke of the frame may be kept small to this end, so that the elastic mounting on the suction nozzle may also be protected, as will hereinafter be described.

BRIEF DESCRIPTION OF THE DRAWINGS

In order that the invention may be more clearly understood, reference will now be made to the accompanying drawings which show some embodiments thereof by way of example and in which.

DETAILED DESCRIPTION OF THE PREFERRED EMBODIMENTS

Figure 1:
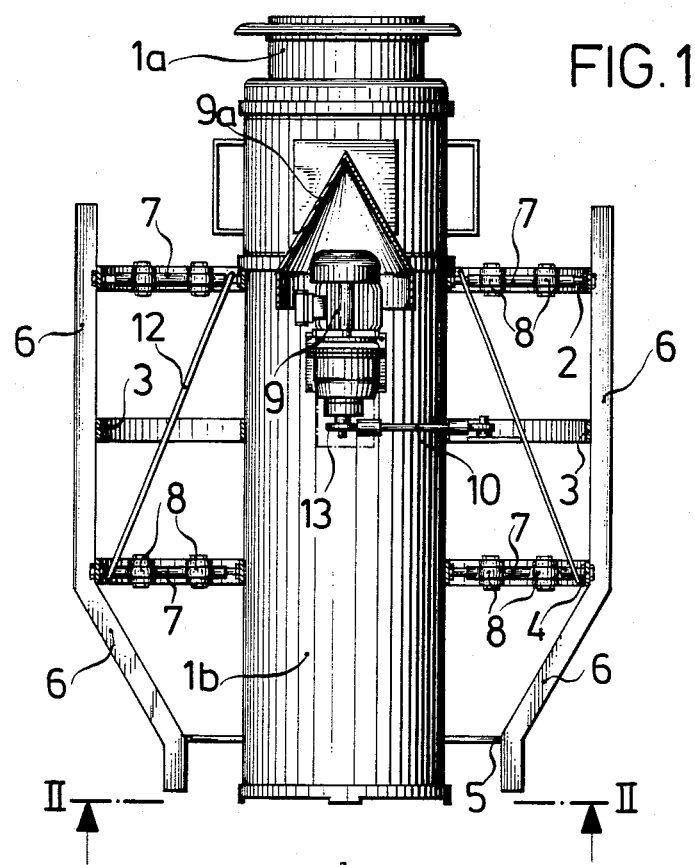
FIG. 1 shows an elevational view of the suction nozzle of a pneumatic extraction device, with the front parts of the oscillating frame being left off.

Referring now to the drawings, a suction nozzle 1a, 1b of a pneumatic device for discharging goods from ships according to the invention, is surrounded by a horizontally oscillating agitator mechanism with spacing therebetween. The mechanism includes a frame consisting of several horizontal rings 2, 3, 4 and 5 concentrically surrounding and spaced from the nozzle, which are joined together at the outer side into a basket-like frame by means of flat bars 6 substantially parallel to the suction nozzle's axis, and having their plane extending radially with respect to the axis of the nozzle. This frame including rings and flat bars is elastically braced against the suction nozzle 1a, 1b in the area of the rings 2 and 4. The supporting means includes rubber elements 7 which are connected via joints 8 having spindles with their axis being parallel to the axis of the suction nozzle 1a, 1b on the one hand, and on the other hand to the rings 2 and 4 of the frame. The lowest frame ring 5 merely serves the purpose of centering the basket-shaped frame, and the flat bars 6 are inwardly drawn in the lower section so that material lying on the bottom may also be loosened around the aperture of the suction nozzle and removed by suction.

Figure 2:
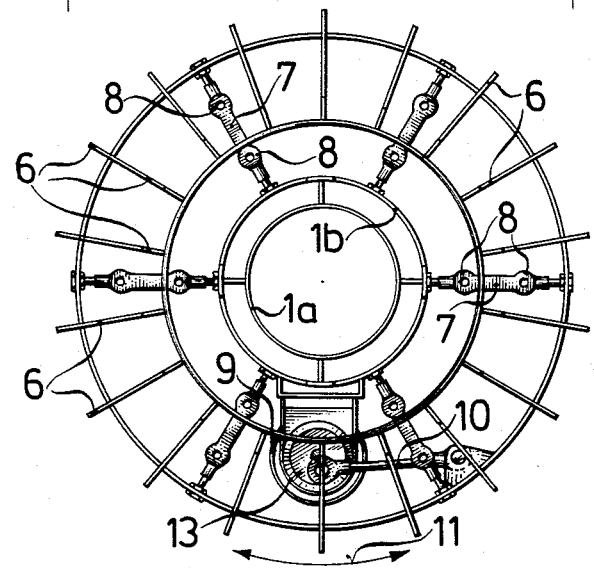
FIG. 2 shows a view of the device as seen from the line II—II of FIG. 1.

The suction nozzle has mounted on it a motor 9 with its drive shaft vertical, which is protected by a top cover 9a against material falling from collapsing walls of material, and places an eccentric plate 13 in rotation, the latter acting in articulated manner on the frame ring 3 via crank 10 and thereby places (or forces) the whole frame into horizontal reciprocatingly oscillating motion in the direction of the arrows 11 according to FIG. 2, so that when the suction nozzle comprising the oscillating frame is offered up to walls of material left standing, the oscillatory displacement of the frame causes collapse of the walls so that even bulk material flowable with difficulty may be loosened for intake by suction by the suction nozzle 1a, 1b.

In order that the rubber elements 7 are not stressed vertically, the frame is suspended by means of ropes or cords 12 whose upper ends act on the suction nozzle 1a, 1b and whose lower ends act on the frame ring 4, for example.

Figure 3:
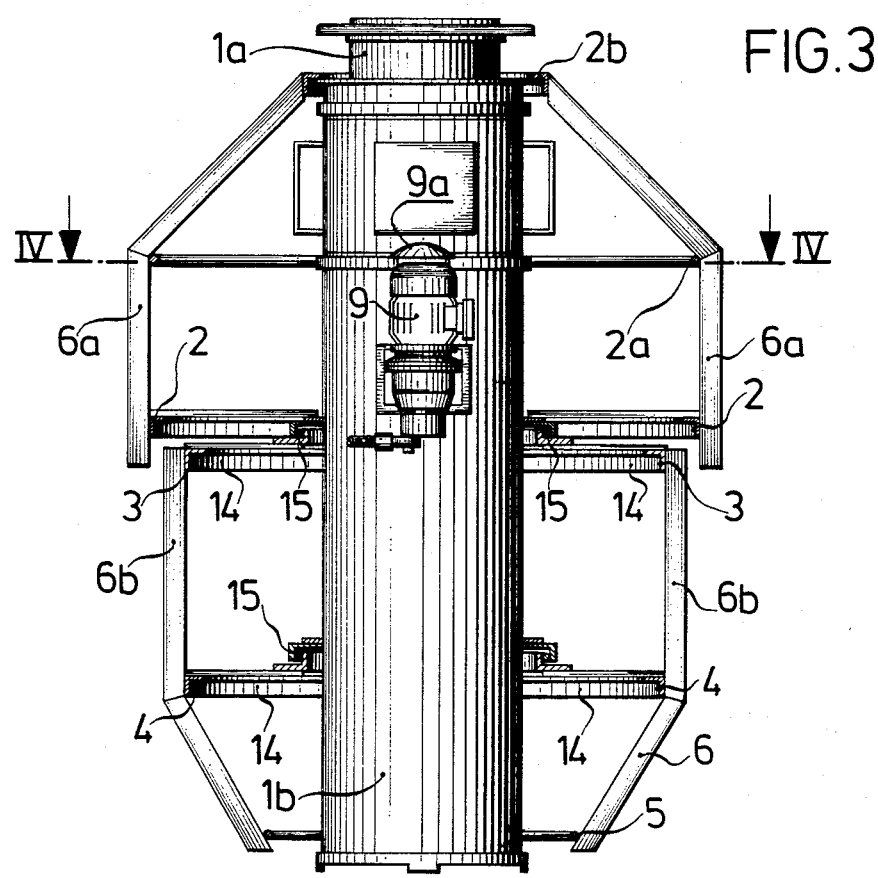
FIG. 3 shows a view corresponding to FIG. 1, with a modified frame and a modified frame supporting system.
Figure 4:
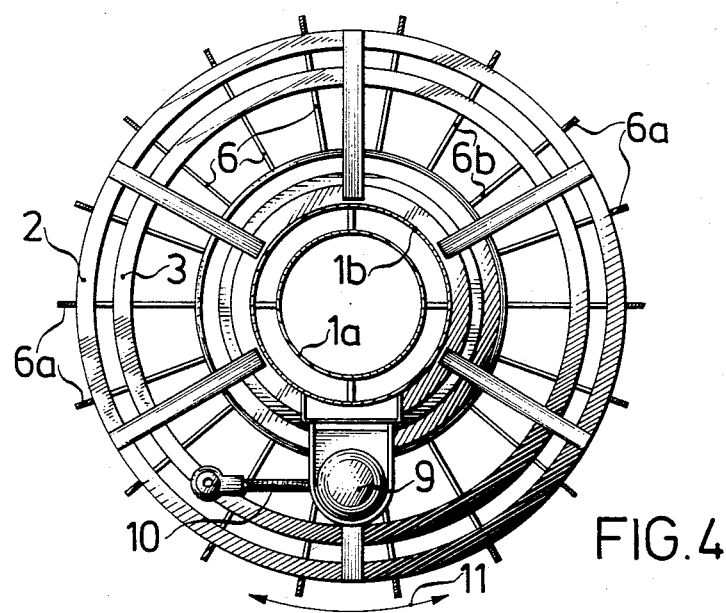
FIG. 4 shows a view as seen from the line IV—IV of FIG. 3.
Figure 5:
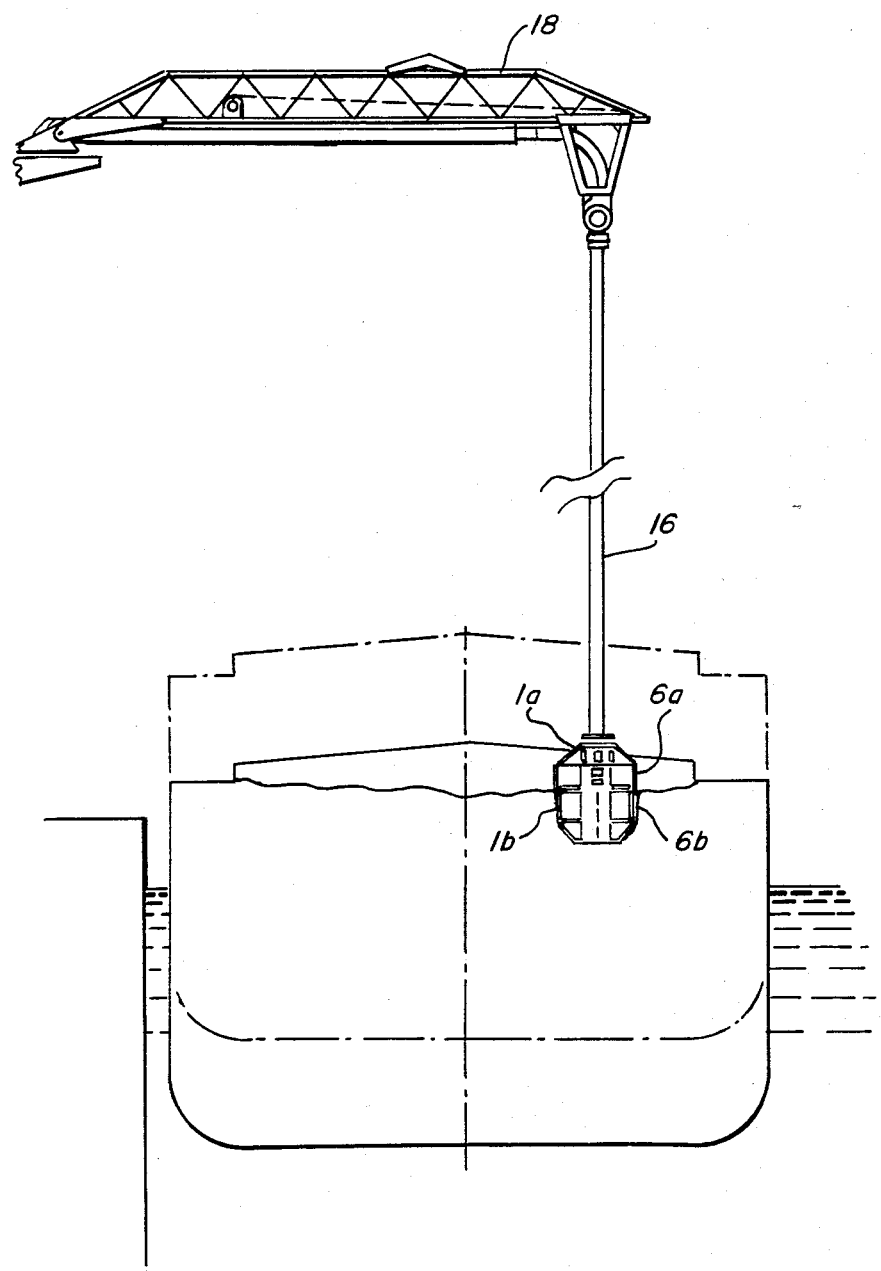
FIG. 5 shows the suction device in place with its relative position to the suspending boom and hold of a ship.

It may be particularly advantageous for the whole oscillatory frame according to FIGS. 1 and 2 and in accordance with FIGS. 3 and 4 to be connected to the suction nozzle 1a, 1b via radial supporting struts 14 and an identical number of support rings 15, so that the pivotal oscillations of the frame occur via the support rings 15, the elastic suspension and articulated connection of the tools to the suction nozzle thereby being eliminated. It should be noted that FIG. 5 shows the entire structure and assembly of the pneumatic suction device of the present invention. It illustrates the suction nozzle 1a-1b suspended by way of suction pipe 16 from the steerable jib 18.

In the case of FIGS. 3 and 4, it is advantageous for the suction nozzle 1a, 1b with the frame oscillating thereon to be suspended from a telescopic conveyor pipe (See FIG. 5), and then to divide the oscillating frame in its height according to FIGS. 3 and 4, the upper frame section with the tools 6a then being rigidly connected to the suction nozzle 1a, 1b by the rings 2, 2a and 2b and radial supporting struts. The lower frame section with the tools 6a is joined in supported manner to the suction nozzle 1a, 1b by at least two radial supporting struts 14 and corresponding rotary rings 15, the pivotal oscillations being generated by an eccentric drive 9, 10, 13 as in the case of FIGS. 1 and 2. Based on this structure, the reaction forces of the eccentric drive also generate a certain rotary entrainment of the suction nozzle 1a, 1b with the upper frame section, thereby causing a contra-directional pivotal displacement of the two frame halves, which leads to increased loosening of the material conveyed and to a reduction of the torque peaks of the eccentric drive.

It is alternatively possible for the bottom frame section to be joined rigidly to the suction nozzle 1a, 1b and thereupon to place the top frame section having the pivotally displaceable mounting and the eccentric drive into pivotal oscillations.

In order that the active areas may be enlarged during break-up of walls of material left standing, the frame may also comprise straight or slightly curved vertical and mutually adjacent struts which at the outer side facing away from the nozzle 1a, 1b are again formed as flat bars corresponding to the bars 6 and are jointed together by transverse struts in one plane, a system of this nature being installed at one side or else on two mutually opposed sides with respect to the suction nozzle, and again being supported on the suction nozzle. These frames are then placed (or forced) into reciprocatingly oscillating motion by means of one or two smaller motors to secure loosening of the material within range of the suction nozzle and of the material of walls of material left standing, and finally to cause these walls to collapse.

We claim:

1. A pneumatic suction device for discharging granulates or other not readily flowable materials from ships, comprising a steerable jib, a suction pipe having a suction nozzle suspended from the steerable jib, a frame surrounding said suction nozzle in a spaced relationship therewith, which frame is formed of a plurality of flat bars arranged in a spaced relationship and being substantially parallel to the longitudinal axis of said suction nozzle and in a plane extending radially with respect to the longitudinal axis of said suction nozzle, and horizontally disposed rings, supported on said suction nozzle in an articulated manner, joining together said plurality of flat bars, and drive means comprising a crank motor mounted on said suction nozzle for placing said frame into horizontal oscillating motion so that said granulates or other not readily flowable materials are loosened for intake by suction by said suction nozzle.

2. A suction device according to claim 1, wherein said frame comprises supporting elements made of rubber, which elements are coupled to said suction nozzle and to said frame via joints having an axis parallel to the axis of said suction nozzle.

3. A suction device according to claim 2, wherein said frame is suspended from said suction nozzle by means of cords fastened at the upper ends thereof to said suction nozzle, and at the lower ends thereof to a respective one of said rings.

4. A suction device according to claim 1, wherein said frame is supported on said suction nozzle by means of radial struts and a corresponding number of support rings.

5. A suction device according to claim 1, wherein said suction nozzle is suspended from a suction pipe and said frame is sub-divided along its height into an upper frame section rigidly connected to said suction nozzle and a lower frame section supported on said suction nozzle by means of radial struts and a corresponding number of support rings, said lower frame section being placed in oscillating motion so that granular and other not flowable materials are loosened for intake by suction by said suction nozzle.

* * * * *